Figure 1:
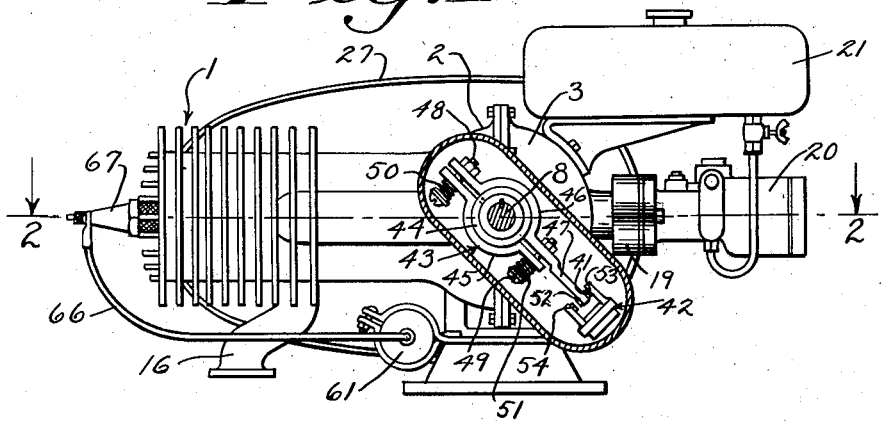

April 14, 1959           D. A. FOX           2,881,744

DIRECT REVERSING INTERNAL COMBUSTION ENGINE

Filed Feb. 28, 1958           2 Sheets-Sheet 1

INVENTOR
DAVID A. FOX, DECEASED
BY CHARLES S. QUARLES,
ADMINISTRATOR

BY Quarles, Fox, Seidel,
Bateman & Hoar

ATTORNEYS

April 14, 1959 D. A. FOX 2,881,744
DIRECT REVERSING INTERNAL COMBUSTION ENGINE
Filed Feb. 28, 1958 2 Sheets-Sheet 2

INVENTOR
DAVID A. FOX, DECEASED
BY CHARLES S. QUARLES,
ADMINISTRATOR

BY *Quarles, Fox, Seidel,
Bateman & Hoar*

ATTORNEYS

United States Patent Office 2,881,744
Patented Apr. 14, 1959

2,881,744

DIRECT REVERSING INTERNAL COMBUSTION ENGINE

David A. Fox, deceased, late of Fox Point, Wis., by Charles S. Quarles, administrator, Whitefish Bay, Wis., assignor to Louise Q. Fox, Virginia Fox Pierson, and Susan J. Fox Application February 28, 1958, Serial No. 718,299

4 Claims. (Cl. 123—41)

This invention relates to ignition apparatus for spark ignition of internal combustion engines and it resides more particularly in an ignition apparatus for two-cycle, internal combustion engines which will cause such engines to directly reverse in response to an electrical circuit alteration such as the throwing of a switch, the apparatus including normal forward and reverse running ignition means, novel auxiliary ignition means activated by compression induced reversal of the crank to produce backfiring which recranks the engine for opposite rotation at the end of a deceleration interval caused by a circuit alteration which disables the normal ignition means, and novel transfer means which restore the normal ignition function for opposite rotation as soon as backfiring has recranked the engine.

Heretofore, two-cycle, internal combustion engines have been directly reversed at times by manual intervention through manipulation of the normal ignition means, but such reversal is dependable only in the case of slow running engines and only when such an engine is manipulated by an expert operator. In the case of small, high speed engines, manual intervention in the functioning of simple ignition means for the purposes of attempting reversal is useless since human reaction time is far slower than is required to perform the manipulation necessary to produce reversal.

Direct reversal has also been induced through compressed air cranking but such is impractical in the case of small, light weight engines because of the cost, weight and bulk of the necessary means for supplying compressed air.

As a result, no practical means for the direct reversal of small, high speed, two-cycle, spark ignition, internal combustion engines has been available.

It is an object of this invention to provide a spark ignition means for a two-cycle, internal combustion engine which is simple, compact and economical and which includes provision for a circuit alteration such as the throwing of a switch which will cause the engine to be directly reversed.

It is a further object of this invention to provide an apparatus which will cause recranking of a two-cycle engine for opposite rotation without requiring special skill on the part of the operator.

It is a further object of this invention to provide a means for reversing a two-cycle, spark ignition, internal combustion engine which is equally effective for low speed and high speed engines and which is entirely dependable.

The foregoing and other objects and advantages of this invention will appear from the description following, which is set forth with reference to the accompanying drawing in which there is set forth by way of illustration and not of limitation certain forms in which this invention may be embodied.

Figure 2:
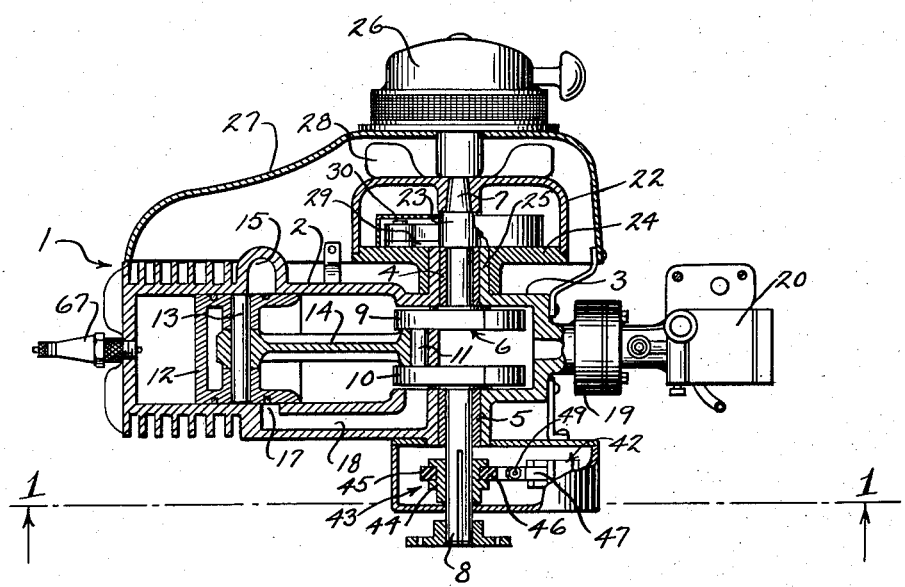
Figure 3:
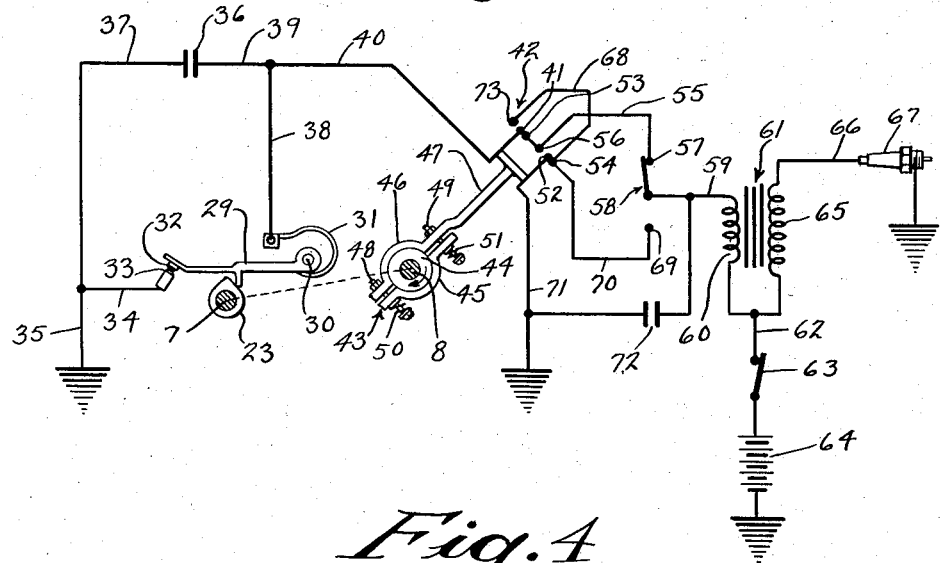
Figure 4:
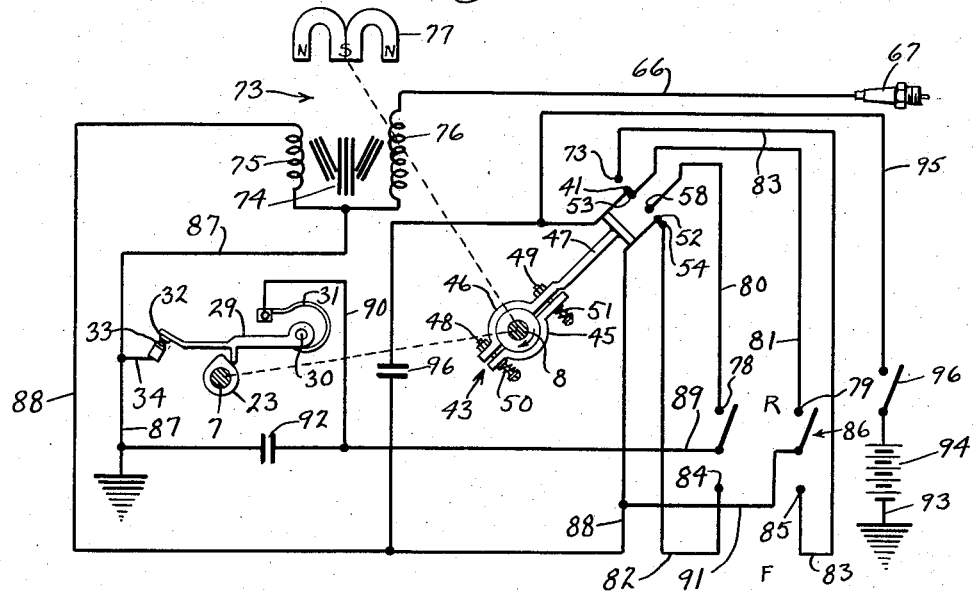

In the drawings:

Fig. 1, is a front view in elevation, and partly in section, of an engine in which the reversing ignition apparatus of this invention is embodied, Fig. 2, is a top plan view partly in section of the engine shown in Fig. 1, Fig. 3, is a circuit diagram showing the reversing ignition apparatus of this invention when embodied in a form suitable to be energized entirely from a battery, and Fig. 4, is a circuit diagram showing another form of the reversing ignition apparatus utilizing a magneto to furnish the spark under normal running and a battery to furnish the spark required for backfiring to recrank the engine.

Referring now to the drawing, Figs. 1 and 2 show a conventional high speed, two-cycle, internal combustion engine of a type advantageously reversed by the apparatus of this invention. The engine shown comprises a single cylinder 1, finned for air cooling and integrally joined with a left-hand crankcase shell 2. The crankcase is completed by a right-hand shell 3 flanged and bolted to the shell 2 in such manner as to secure the crankshaft bearings 4 and 5 in position as shown in Fig. 2, and to form a closed cavity.

Rotatably mounted in the bearings 4 and 5 is a crankshaft 6 having a flywheel end or spindle 7 and a driving end 8 joined by the cheeks 9 and 10 and throw 11. A piston 12, slidable in the bore of cylinder 1, is joined by wrist pin 13 and connecting rod 14 with the throw 11 of crank 6.

An exhaust port 15 joins with a muffler 16 and is located to be uncovered by piston travel slightly in advance of the uncovering of inlet port 17 located on the opposite side of the cylinder 1. Port 17 is connected through transfer passage 18 with the interior of the crankcase cavity which is, in turn, supplied with fuel, air and lubricant mixture, delivered through induction valve 19 from carburetor 20. A fuel tank 21 is connected, as shown, to the carburetor 20.

Secured to the spindle 7 to rotate with the crank 6 is a flywheel 22 and a breaker cam 23 located adjacent a breaker arm mounting plate 24, rotatable about a crankcase projection 25 concentric with spindle 7. A rewind rope starter 26 is secured, as shown, to a fan shroud 27 which carries the discharge from flywheel fan 28 to cylinder 1 for cooling.

In the form of the circuit of this invention, shown in Fig. 3, a breaker arm 29, pivotally mounted on insulating post 30 carried on plate 24, is held with the wiper thereof in position to be engaged by the rise of cam 23 so as to cause separation of breaker contacts 32 and 33 by moving arm 29 against the action of return spring 31. Stationary contact 33 is joined to ground as indicated at 34 and 35, while a capacitor 36 is connected in shunt relation to it and contact 32 by leads 37, 38 and 39 and spring 31, as shown.

The breaker contact 32 is connected also, through lead 40, with movable contact 41 of a transfer switch 42, controlled by a slip drive 43. The slip drive 43 comprises a grooved collar 44 secured to the end 8 of crank 6 to rotate therewith and of a closely surrounding split ring 45—46 from which an actuating arm 47 projects as shown. The split portions 45—46 are joined by bolts 48—49 loaded lightly by springs 50—51 to cause a slight but continuous and perceptible frictional engagement between the split portions 45—46 and the groove in collar 44. The split portions 45—46 are preferably composed of phenol aldehyde resin carrying graphite or other lubricant which will afford good dry-bearing properties so that wear, under long service, will be negligible. By reason of the construction described, the actuating arm 47 of the slip drive 43 is subjected to frictionally induced torque applied in the direction of rotation of crank 6. Contacts 41 and 52 are thus urged in the direction of crank rotation. When crank rotation is clockwise or forward, as viewed in Figs. 1 and 3, movable contacts 41 and 52 are held in the position shown, that is in engagement with stationary contacts 53 and 54 respectively, when crank rotation is the opposite, the opposite contact position is assumed.

Contact 53 is joined with contact 56 and by lead 55 with contact 57 of selector switch 58. If switch 58 is manually or otherwise closed on contact 57, as shown, a connection extends through lead 59 to the primary winding 60 of an induction coil 61. The primary winding 60 is connected in turn through lead 62, switch 63 and low tension current source 64 to ground.

The secondary winding 65 of coil 61 is thus excited and supplies an ignition spark through high tension lead 66 to spark plug 67 as the shaft 6 continues forward rotation producing separation of contacts 32—33 at correctly timed intervals.

Contact 54 is joined through conductor 68 with a stationary contact 73 positioned to be engaged by movable contact 41, which engagement will occur if reverse rotation of crank 6 can be induced. This is accomplished by throwing the selector switch 58 to the position opposite that in which it is shown in Fig. 3. In this position the switch 58 is closed upon contact 69 which is joined with stationary contact 54 by lead 70. Movable contact 52, insulated from movable contact 41, is joined by a lead 71 with ground while leads 71 and 59 are shunted by a condenser 72. The primary winding of coil 61 is thus joined directly to ground independently of the action of breaker contacts 32—33 and ignition ceases. Without ignition the engine rapidly decelerates.

By reason of the uneven load imposed upon the crank 6 by the piston 12, forward rotation in all probability will cease at a time in the stroke of piston 12 when compression is rising. This being the case, particularly if the main load is one which becomes negligible at low speeds (and automatic centrifugal clutch means may be employed between the output shaft and load to insure this), the crank 6 will reverse under the expansive force of the charge trapped above the piston. As soon as the initial reversal occurs, slip drive 43 is immediately urged in reverse rotation and transfer switch 42 moves toward its opposite position. Separation of contact 52 from contact 54 immediately causes a discharge of the coil 61 and the engine backfires with sufficient force to reverse crank itself.

Prior to the time when piston 12 achieves firing position in its reverse operation, movable contact 41 comes into engagement with stationary contact 73 which re-establishes a firing circuit through contacts 32—33 for continued reverse running of the engine. The rise of cam 23 may be of such angular span as to provide the proper lead or advance of the spark in both forward and reverse rotation, if fixed spark advance is desired or the breaker plate 24 may be manually or automatically adjusted to aid both reversal and running.

Return of selector switch 58 to the position shown in Fig. 3, will, by a similar action, while reverse rotation is in course, cause the engine to die, to backfire for recranking in forward direction and to resume forward running. All of these actions can occur independently of any manual intervention except for the throwing of switch 58. The extension of leads 59, 55 and 70 is easily accomplished, thus permitting the placement of switch 58 in a location remote from the engine. This is of advantage in cases where the engine is used for propulsion of boats and certain land vehicles and power driven implements.

The current source 64 may consist of the usual battery of primary or secondary cells supplemented, if desired, by an engine driven low tension magneto or generator. In cases where it is desired to operate upon a battery of minimum bulk, the circuit appearing in Fig. 4, wherein a high tension magneto, depended upon for running ignition, may be employed. The apparatus of this invention in the form employing the circuit of Fig. 4 may, for example, employ an engine identical with that shown in Figs. 1 and 2.

The engine, in this form, may be equipped, as in Figs. 1, 2 and 3, with a breaker cam 23 mounted on the spindle 7 of a crank 6 and with a collar 44 surrounded by a slip drive 43 mounted on end 8 of shaft 6. Identical numerals in Fig. 4 are employed to indicate parts identical with those of Fig. 3. The apparatus, however, includes in place of an induction coil a magneto 73 including a magnetic frame 74, a primary winding 75, a connected secondary winding 76 and double permanent magnets 77, the latter being relatively movable with respect to the remaining magneto parts in response to crank rotation in timed relation to cam 23.

With the parts in the position shown in Fig. 4, if the switch 86 is closed upon the contacts 84 and 85 and forward running of the engine has been established, continued running is sustained by the action of magneto 73, the primary winding of which is grounded through lead 87. Discharge of the magneto 77 in timed relation, is controlled by the circuit extending through lead 88 to contact 52, thence through contact 54 and lead 82, thereafter through switch 86 and lead 89 to lead 90 which joins with breaker arm 29 and from breaker contact 32 to contact 33 and thence through leads 34 and 87 to ground. Switch 86 being closed on contact 85 under such conditions i.e., forward running produces no effect since lead 83 is joined with contact 73 which, at that time, is isolated. Proper discharge of the magneto 73 is assisted by condenser 92 which shunts the contacts 32—33 in known manner.

When reversal is desired, switch 86 is thrown, while the engine is running forward, to close upon the contacts 78 and 79. When this is done the access of primary winding 75 to ground through breaker contacts 32—33 is temporarily suspended, and the engine being without ignition decelerates. This condition continues until the engine stops on compression and executes a small retrograde rotation. The ensuing shifting of switch 42, first separates contacts 41 and 53 which interrupts a circuit extending from ground through lead 93, battery 94, switch 96, which must be assumed closed, lead 95, the contacts 41 and 53, already mentioned, lead 81, contact 79, switch 86, lead 91, lead 88, primary winding 75, lead 87 and thence back to ground. The breaking of this circuit causes magneto 73 to function as an induction coil causing a spark at 67. The resulting backfire recranks the engine for reverse running.

Immediately upon appreciable reverse rotation, switch 42 moves to its full reverse running position bringing contacts 52 and 56 into engagement. This action re-establishes the magneto primary circuit from lead 88 through lead 80, contact 78 and switch 86 to lead 89 previously described. The magneto 77 being double and being properly timed energizes the remaining parts of the magneto 73 for reverse running ignition.

Battery 94 performs its function with the aid of capacitor 96 positioned in accordance with known practice as shown. Battery 94 is subjected to load only during the brief interval between the throwing of switch 86 and reversal of the engine. Battery 94 will, therefore, be subjected to very little deterioration due to imposed load and may be quite small.

Upon throwing of switch 86 oppositely, while the engine is running in reverse, lead 83 and contact 85 serve to set up the temporary battery energized backfire circuit and as soon as opposite motion of the crank sets in a backfire (or front fire) cranks the engine for forward running thus establishing again the forward magneto circuit described above.

It will appear from the description given that switches 58 or 86, may, by simply extending the leads joined therewith, be placed in a position remote from the engine controlled thereby, thus facilitating the control of motor

I claim:

1. In a direct reversing, two-cycle, spark ignition, internal combustion engine having a cylinder, a piston slidable in the cylinder, a spark plug in the cylinder, a crankshaft, and a connecting rod connecting said crankshaft and piston, that improvement in the ignition means therefor which comprises breaker switch means, means associated with the crankshaft cooperating with said breaker switch means to open the same in advanced timed relation to top dead center of said piston travel when said crankshaft is revolving either forwardly or backwardly, an induction means comprising a magnetic core, a low tension primary winding in circuit with said breaker switch means and a high tension secondary winding in circuit with said spark plug, means operative to induce magnetization of said core prior to opening of said breaker switch means to cause a spark discharge to be delivered to said spark plug by said secondary winding when said engine is turning in either direction of rotation, drag means in torque receiving relation to said crankshaft adapted to be urged and to move through a short excursion in the direction of rotation of said crankshaft, transfer switch contacts cooperatively engaged by said drag means movable to and from forward and reverse running positions of engagement thereof and operative to complete one of a pair of primary circuits through said primary winding and the contacts of said breaker switch means, selector switch means connected to said transfer switch means adapted to be thrown to anticipatively activate that primary circuit through said primary winding and said breaker switch means which corresponds to running in the direction opposite to the direction of running prevailing and to disable the previous prevailing active primary circuit to cause deceleration of the engine to a stop followed by compression induced reversal, and backfire contact means cooperatively engaged by said drag means adapted to be placed in circuit with said primary winding by the throwing of said selector switch means and adapted to be separated by said compression induced reversal of said crankshaft to cause a recranking backfire to occur to change the direction of rotation of said engine.

2. In a direct reversing, two-cycle, spark ignition, internal combustion engine having a cylinder, a piston slidable in the cylinder, a spark plug in the cylinder, a crankshaft, and a connecting rod connecting said crankshaft, and piston, that improvement in the ignition means therefor which comprises breaker switch means, means associated with the crankshaft cooperating with said breaker switch means to open the same in advanced timed relation to top dead center of said piston travel when said crankshaft is revolving either forwardly or backwardly, an induction means comprising a magnetic core, a low tension primary winding in circuit with said breaker switch means and a high tension secondary winding in circuit with said spark plug, a battery, battery switch means closable to connect said battery in circuit with the low tension primary winding to induce magnetization of said core prior to opening of said breaker switch means to cause a spark discharge to be delivered to said spark plug by said secondary winding when said engine is turning in either direction of rotation, drag means in torque receiving relation to said crankshaft adapted to be urged and to move through a short excursion in the direction of rotation of said crankshaft, transfer switch contacts cooperatively engaged by said drag means movable to and from forward and reverse running positions of engagement thereby and operative to complete one of a pair of primary circuits through said primary winding and the contacts of said breaker switch, selector switch means connected to said transfer switch means adapted to be thrown to anticipatively activate that primary circuit through said primary winding and said breaker switch means which corresponds to running in the direction opposite to the direction of running prevailing and to disable the previous prevailing active primary circuit to cause deceleration of the engine to a stop followed by compression induced reversal, and backfire contact means cooperatively engaged by said drag means adapted to be placed in circuit with said primary winding by the throwing of said selector switch means and adapted to be separated by said compression induced reversal of said crankshaft to cause a recranking backfire to occur to change the direction of rotation of said engine.

3. Apparatus according to claim 2 in which the induction means is a magneto including means for supplying current for ignition when the battery switch is opened.

4. Apparatus according to claim 1 in which the drag means includes a collar secured to and rotatable with the crankshaft, a split ring surrounding a portion of the collar and in predetermined frictional engagement therewith, and a switch actuating arm secured to and extending from said ring.

References Cited in the file of this patent

UNITED STATES PATENTS

| | | |
|---|---|---|
| 785,922 | Termatt | Mar. 28, 1905 |
| 788,594 | Perkins | May 2, 1905 |
| 868,476 | DuPont | Oct. 15, 1907 |